US006582657B2

(12) United States Patent
Warner et al.

(10) Patent No.: US 6,582,657 B2
(45) Date of Patent: Jun. 24, 2003

(54) DOSIMETER AND METHOD FOR USING THE SAME

(75) Inventors: Benjamin P. Warner, Los Alamos, NM (US); Deidre M. Johns, Boulder, CO (US)

(73) Assignee: The Regents of the University of California, Los Alamos, NM (US)

( * ) Notice: Subject to any disclaimer, the term of this patent is extended or adjusted under 35 U.S.C. 154(b) by 0 days.

(21) Appl. No.: 09/730,108

(22) Filed: Dec. 4, 2000

(65) Prior Publication Data

US 2002/0068016 A1 Jun. 6, 2002

(51) Int. Cl.[7] ............................................... G01N 31/22

(52) U.S. Cl. ........................ 422/56; 422/119; 436/57; 436/58; 250/482.1; 250/483.1; 250/487.1; 430/225; 430/226

(58) Field of Search ................ 422/56, 119; 436/57, 436/58; 430/225, 226; 250/482.1, 483.1, 487.1

(56) References Cited

U.S. PATENT DOCUMENTS

| | | | | |
|---|---|---|---|---|
| 2,483,991 A | * | 10/1949 | Wollan et al. | 250/482.1 |
| 2,659,013 A | * | 11/1953 | Davis et al. | 250/482.1 |
| 3,691,380 A | | 9/1972 | Hübner et al. | 250/83 CD |
| 3,891,852 A | * | 6/1975 | Bollen et al. | 250/391 |
| 3,899,677 A | | 8/1975 | Hori et al. | 250/474 |
| 4,207,104 A | * | 6/1980 | Chapman et al. | 430/225 |
| 5,482,813 A | * | 1/1996 | Tadashi | 430/139 |

OTHER PUBLICATIONS

W. H. Hallenbeck, "Radiation Protection," Lewis Publishers, Ann Arbor, MI, 1994, pp. 47, 48, 51, 52, 62–66.

Victoria McLane, Charles L. Dunford, and Philip F. Rose, "Neutron Cross Sections," National Nuclear Data Center, Brookhaven National Laboratory, Academic Press, Inc., Harcourt Brace Jovanovich, San Diego, 1988, vol. 2, pp. 387–392.

C. M. Davisson and R. D. Evans, "Gamma–Ray Absorption Coefficients," Reviews of Modern Physics, 1952, vol. 24, No. 2, pp. 79–107.

(List continued on next page.)

*Primary Examiner*—Jill Warden
*Assistant Examiner*—LaToya Cross
(74) *Attorney, Agent, or Firm*—Samuel L. Borkowsky

(57) ABSTRACT

A very sensitive dosimeter that detects ionizing radiation is described. The dosimeter includes a breakable sealed container. A solution of a reducing agent is inside the container. The dosimeter has an air-tight dosimeter body with a transparent portion and an opaque portion. The transparent portion includes a transparent chamber that holds the breakable container with the reducing agent. The opaque portion includes an opaque chamber that holds an emulsion of silver salt (AgX) selected from silver chloride, silver bromide, silver iodide, and combinations of them. A passageway in the dosimeter provides fluid communication between the transparent chamber and the opaque chamber. The dosimeter may also include a chemical pH indicator in the breakable container that provides a detectable color change to the solution for a pH of about 3–10. The invention also includes a method of detecting ionizing radiation that involves producing the dosimeter, breaking the breakable container, allowing the solution to flow through the passageway and contact the emulsion, detecting any color change in the solution and using the color change to determine a radiation dosage.

18 Claims, 2 Drawing Sheets

OTHER PUBLICATIONS

F. H. Attix, and W. C. Roesch, ed., "Radiation Dosimetry," Academic Press, 1966, vol. II, chapter 13, pp. 241–290.

F. H. Attix, and W. C. Roesch, ed., "Radiation Dosimetry," Academic Press, 1966, vol. II, chapter 15, pp. 325–387.

F. H. Attix, and E. C. Tochilin, ed., "Radiation Dosimetry," 1966, Academic Press, vol. III, chapter 28, pp. 557–616.

T. H. James, "Kinetics of Development by the Ferrous Ethylenediaminetetraacetate Complex Ion," Photographic Science and Engineering, Sep.–Oct. 1960, vol. 4, No. 5, pp. 271 to 280.

T. H. James, editor, "The Theory of Photographic Process," The MacMillan Company, 1966, 3rd edition, chapter 13, pp. 278–311.

"Neutron Fluence, Neutron Spectra and Kerma," ICRU Report 13, International Commission on Radiation Units and Measurements, 4201 Connecticut Ave, NW, Washington, DC 20008, Sep. 15, 1969, pp. 6 and 10.

Richard W. Ramette, "Chemical Equilibrium and Analysis," Addison–Wesley Publishing Company, 1981, pp. 338–341 and 364.

Robert C. Weast, Melvin J. Astyle, and William H. Beyer, "CRC Handbook of Chemistry and Physics," CRC Press, Inc., Boca Raton, Florida, 1984, pp. D–151 to D–155.

\* cited by examiner

DOSIMETER AND METHOD FOR USING THE SAME

STATEMENT REGARDING FEDERAL RIGHTS

This invention was made with government support under Contract No. W-7405-ENG-36 awarded by the U.S. Department of Energy. The government has certain rights in the invention.

FIELD OF THE INVENTION

The present invention relates generally to dosimetry and more particularly, to a dosimeter and method for using the same to detect and quantify a dosage of ionizing radiation.

BACKGROUND OF THE INVENTION

It is important for those working with or near hazardous radiation sources to determine their level of exposure to the radiation, i.e. the radiation dosage. Situations can arise where workers must stop work and leave their work site when they have been exposed to a radiation dosage that exceeds a predetermined value. Dosimetry relates to the measurement of radiation dosages, and a dosimeter is a portable radiation sensor that provides the wearer with a radiation dosage and may identify the type or types of radiation that contribute to that dosage. Exposure of a dosimeter to radiation produces physical and/or chemical changes in the dosimeter. An analysis of these changes can provide information relating to the type of radiation to which the dosimeter has been exposed, the dosage of that type of radiation, the total dosage of several types of radiation, and other valuable information depending on the type of dosimeter. Some types of dosimeters provide the user with this information in 'real-time', i.e. immediately, so that the user can quickly determine whether to continue working or stop work and leave the area to avoid continued exposure.

Dosimeters usually include a radiation-sensing element enclosed within a protective housing. The housing may also act as a radiation filter, selectively absorbing some types of radiation but not others. A thin plastic housing, for example, can absorb alpha radiation but pass beta radiation. A cardboard, aluminum, or thick plastic housing can absorb both alpha and beta radiation, while a lead housing can absorb even more penetrating radiation such as gamma rays and x-rays.

Some types of dosimeters include or can be used with a mechanical meter to indicate the numerical value of a particular radiation dosage. Other types of dosimeters use the appearance or disappearance of a particular color to indicate that the dosimeter has been exposed to at least a predetermined threshold of radiation. These "colorimetric" dosimeters may provide a range of colors and/or intensities of colors that are easily compared to a color chart to determine the radiation dosage. U.S. Pat. No. 3,899,677, for example, entitled "Plastic for Indicating a Radiation Dose" by Y. Hori et al., which issued Aug. 12, 1975, describes a colorimetric dosimeter. The dosimeter is produced by preparing a solution of a chlorinated polymer, a plasticizer, and at least one acid sensitive coloring agent, and then coating a support with the solution to form a film. Irradiation of the supported film produces hydrogen chloride, which reacts with the coloring agent to produce a visible color change. U.S. Pat. No. 3,691,380 entitled "Threshold Value Dosage Meter" by K. Hubner et al., which issued Sept. 12, 1972, describes another colorimetric dosimeter that detects 0.5–10 megarad dosages of ionizing radiation. The dosimeter is produced by preparing an aqueous solution of polyvinyl alcohol, methyl orange indicator, chloral hydrate, and sodium tetraborate (borax) buffer, and then coating a support with the solution to form a film. Irradiation of the supported film with ionizing radiation results in the production of hydrogen chloride, which reacts with the indicator to produce a color change. The borax buffer attenuates the radiation threshold of the dosimeter by reacting with initially generated hydrogen chloride. After the buffer is exhausted, any additional hydrogen chloride present reacts with the indicator.

A wide variety of radiation-sensing materials are available. Some are more sensitive to ionizing radiation than others. Silver-containing dosimeters are among the most sensitive since silver has a high cross section for many different types of radiation. The "DT-60" personal dosimeter, for example, includes a block of silver-activated phosphate glass housed in a plastic locket; it is described in more detail in "Radiation Dosimetry", edited by F. H. Attix et al., Academic Press, (1966), vol. II, chapter 13, page 258. Silver can also be employed as an emulsion of microscopic silver halide crystals dispersed in gelatin. These emulsions are typically coated onto a support to form films. When such a film is exposed to radiation, an image is produced. The image can be in the form of particle tracks, and an analysis of the tracks can provide the identity and the energy of the particles that produced the tracks. Descriptions of dosimeters that employ silver emulsions can be found in "Radiation Dosimetry", vol. II, chapter 15, and vol. III, chapter 28.

The chemical reactions resulting from the interaction of radiation and silver salt particles are well known for silver emulsions used in photography, and are summarized by equations 1, 2, and 3 below:

$$(AgX)_n + \text{radiation} \rightarrow (AgX)_{n-m} Ag^0{}_m + (X_2)_{m/2} \quad \text{(equation 1)}$$

$$(AgX)_{n-m} Ag^0{}_m + (RH)_{n-m} \rightarrow Ag_n{}^0 + (HX)_{n-m} + R_{n-m} \quad \text{(equation 2)}$$

$$HX + B \rightarrow HBX \quad \text{(equation 3)}$$

As equation 1 shows, radiation interacts with a silver halide salt grain $(AgX)_n$ to produce a halogen $(X_2)$ and an aggregate grain $((AgX)_{n-m} Ag^0{}_m)$ having both silver salt and silver metal $(Ag^0)$. Halide X is typically bromide, chloride, iodide, or a mixture thereof, and the radiation includes non-ionizing radiation such as visible and ultraviolet (UV) radiation, and/or ionizing radiation such as alpha-, beta-, gamma-, x-ray-, neutron-, electron beam-, and proton beam radiation. A reducing agent (RH), i.e. the photographic developer, rapidly reduces the aggregate grain to produce silver metal $(Ag^0)$, an oxidation product (R), and acid (HX). A buffer system is added to prevent the acid from lowering the pH of the emulsion and altering the activity of the developer, which would result in an underdeveloped or overdeveloped photographic image. The reaction of acid HX with base B of the added buffer system to form an acid-base complex (HBX) is shown in equation 3.

It is clear that very sensitive real-time dosimeters are highly desirable. Although dosimeters that employ silver as a radiation-sensing element are among the most sensitive, these types of dosimeters cannot be used to measure a radiation dosage in real-time.

Therefore, an object of the present invention is to provide a highly sensitive method of detecting ionizing radiation.

Another object of the present invention is to provide a highly sensitive dosimeter.

Yet another object of the present invention is to provide a dosimeter having a silver-containing radiation sensing element.

Still another object of the present invention is to provide a dosimeter that detects ionizing radiation while preventing interference from non-ionizing radiation.

Another object of the present invention is to provide a dosimeter that achieves the foregoing objects and also enables the user to measure radiation dosages in real-time.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes a dosimeter that detects ionizing radiation. The dosimeter includes a breakable sealed container. A solution of a reducing agent is inside the container. The dosimeter has an air-tight dosimeter body with a transparent portion and an opaque portion. The transparent portion includes a transparent chamber that holds the breakable container with the reducing agent. The opaque portion includes an opaque chamber that holds an emulsion of silver salt (AgX) selected from silver chloride, silver bromide, silver iodide, and combinations of them. A winding passageway in the dosimeter provides fluid communication between the transparent chamber and the opaque chamber.

The dosimeter may also include a chemical pH indicator in the breakable container that provides a detectable color change to the solution at a pH of about 3–10.

The invention also includes a method of detecting ionizing radiation. The method includes providing a dosimeter that detects ionizing radiation. The dosimeter includes a breakable sealed container with a solution of a reducing agent stored inside. The dosimeter also includes a silver salt (AgX) selected from silver chloride, silver bromide, silver iodide, and mixtures thereof. The dosimeter has an airtight body with a transparent portion for receiving the sealed breakable container and an opaque portion that includes an opaque chamber for receiving the silver salt containing emulsion and an opaque passageway that provides fluid communication between the transparent chamber and the opaque chamber. To practice the method, the dosimeter is exposed to ionizing radiation. After breaking the container and allowing the solution to flow through the opaque passageway to the opaque chamber and physically contact the emulsion, the solution is returned to the transparent portion of the dosimeter. A detected color change in the solution can be used to determine a radiation dosage.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION OF THE INVENTION

The present invention includes a highly sensitive dosimeter that detects ionizing radiation and can be used to determine a radiation dosage in real-time. The dosimeter of the present invention combines the rapid response and general ease of use of calorimetric dosimeters with the high sensitivity of silver toward ionizing radiation. Highly sensitive, real-time, silver-containing dosimeters have been described in U.S. Provisional Application No. 60/095,705 to B. P. Warner, and in U.S. patent application Ser. No. 09/312,753 entitled "Dosimetry Using Silver Salts" to B. P. Warner, both of which are hereby incorporated by reference. These dosimeters had a maximum service lifetime of about 24 hours after construction. In contrast, the dosimeter of the present invention can be stored indefinitely after construction and afterward can be worn for a period of hours to months and then used to determine the radiation dosage over that period.

Figure 1:
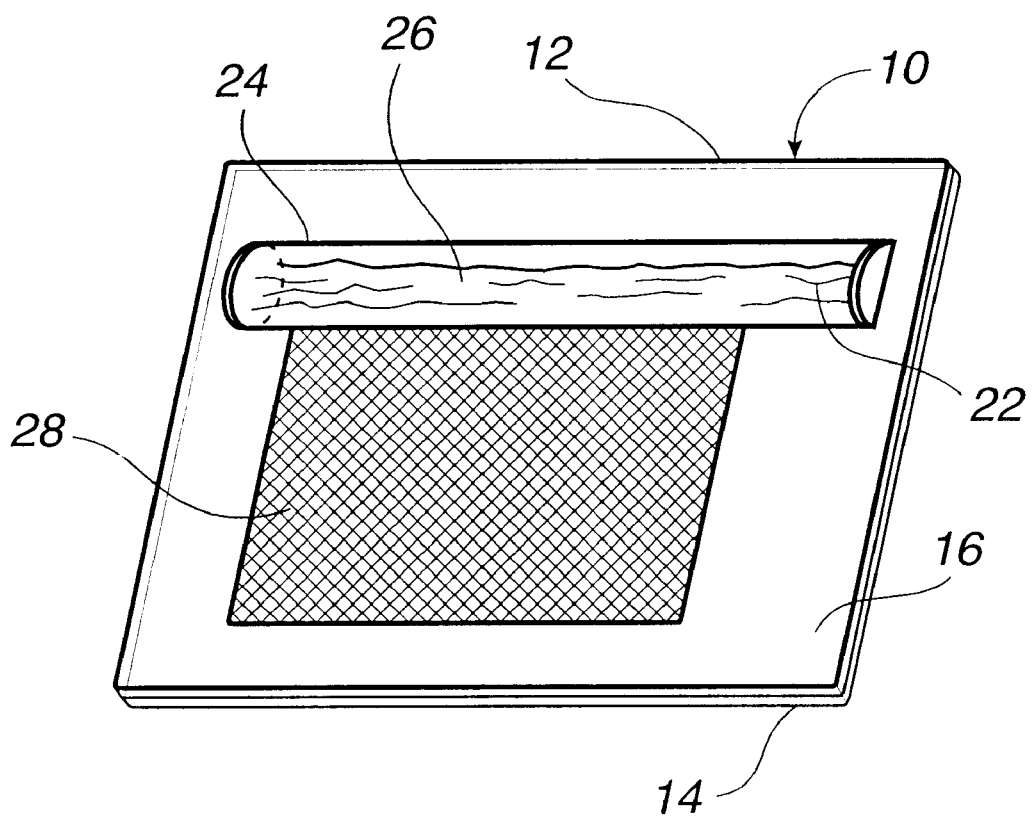
FIG. 1 shows an perspective view of the dosimeter of the present invention.
Figure 2:
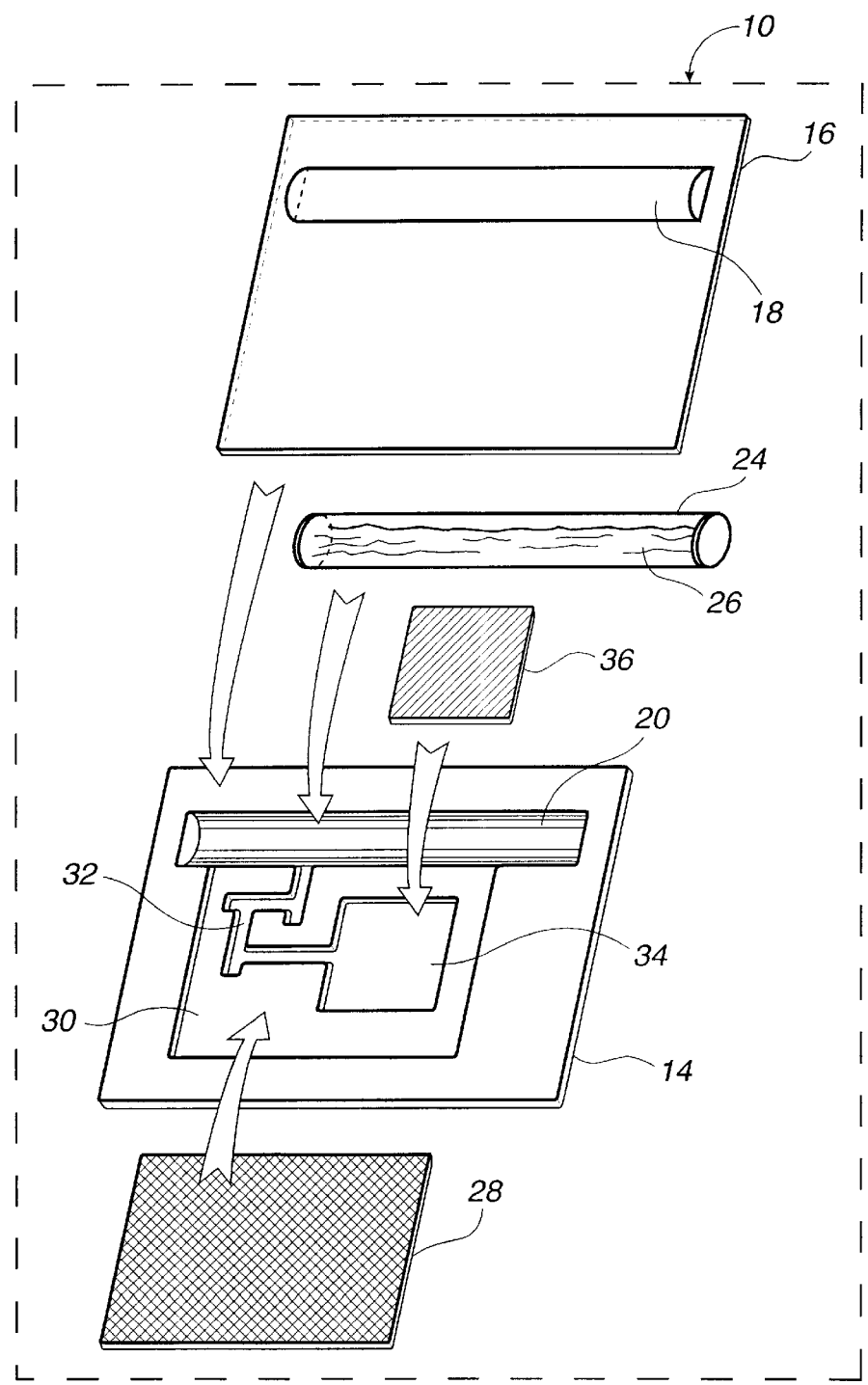
FIG. 2 shows an exploded view of the dosimeter of FIG. 1.

FIG. 1 shows a perspective view of an assembled embodiment of the dosimeter of the present invention, and FIG. 2 shows an exploded view thereof. Dosimeter 10 has a substantially flat, airtight body 12. Body 12 includes an opaque body member 14 attached to a transparent body member 16. As FIG. 2 shows, body member 14 and body member 16 include first recessed portion 18 and second recessed portion 20 that together form body chamber 22 (see FIG. 1) when body members 14 and 16 are attached. Chamber 22 is configured to receive sealed container 24, which contains a solution 26 of a reducing agent and, in most cases, a chemical pH indicator. While sealed container 24 shown in FIG. 1 and FIG. 2 has a tubular shape, it should be understood that containers having a disc shape, a rhombohedral shape, a spherical shape, or the like can also be used with a suitably shaped body chamber. Dosimeter 10 also includes an opaque body plate 28 that fits into third recessed portion 30 of body member 14. Third recessed portion 30 includes winding passageway 32 extending from recessed portion 20 to cavity 34. Sensor 36, typically a silver-salt emulsion coated onto a support, fits into cavity 34. Dosimeter 10 is assembled at least in part in the dark to prevent exposing sensor 30 to ambient light. Specifically, parts 14, 28, and 36 should be assembled in the dark or under photographic safe lights to prevent the unwanted exposure of 36 to ambient light. Sensor 36 is placed into cavity 34. After body plate 28 is placed into third recess portion 30, sensor 36 is protected from ambient light since light cannot enter cavity 34, or enter passageway 32 and reach cavity 34 to expose sensor 36. Solution 26 is prepared and sealed inside container 24, which is then placed within recess 20. After body member 14 is sealed to body member 16, dosimeter 10 is ready for use.

Sensor 36 cannot interact with radiation that has not first passed through dosimeter body 12. Although the opaque portions of the dosimeter prevent ambient light from interacting with sensor 36, ionizing radiation can pass through and interact with the sensor. This interaction is summarized by equation 4 below:

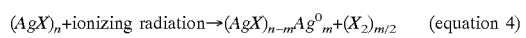

$$(AgX)_n + \text{ionizing radiation} \rightarrow (AgX)_{n-m}Ag^0{}_m + (X_2)_{m/2} \quad \text{(equation 4)}$$

According to equation 4, ionizing radiation reacts with silver halide $(AgX)_n$ to produce the aggregate product $(AgX)_{n-m}Ag^0{}_m$. The aggregate product includes both silver halide and silver metal. In order to measure the radiation dosage, the user breaks container 24, whereby solution 26 escapes and flows through passageway 32 and into cavity 34 where it contacts the silver salt emulsion. A sequence of chemical reactions between the aggregate product $(AgX)_{n-m}Ag^0{}_m$ and chemicals in the solution begins, described by equations 5 and 6 below:

$$(AgX)_{n-m}Ag^0_m + (RH)_{n-m} \rightarrow Ag_n^0 + (HX)_{n-m} + R_{n-m} \quad \text{(equation 5)}$$

$$HX + Ind \rightarrow HIndX \quad \text{(equation 6)}$$

According to equation 5, aggregate product $(AgX)_{n-m}Ag^0_m$ reacts with reducing agent RH to produce silver metal Ag(0), oxidized product (R), and acid (HX). According to equation 6, HX reacts with a pH indicator (Ind) to produce the indicator complex (HIndX), which is accompanied by a visually detectable color change. In practice, reducing agent (RH) is chosen such that it selectively reacts with aggregate species $(AgX)_{n-m}Ag^0_m$ rather than with $(AgX)_n A1$. For one aspect of the invention, the reducing agent provides a detectable color change after it is oxidized. Although a separate pH indicator may not be required for this aspect, one could still be used in order to enhance the intensity of the color change and make it more easily detectable and quantifiable.

Silver halides used with the present invention include silver chloride, silver bromide, silver iodide, or mixtures thereof. Although no exact physical form of the silver halide such as a single crystal, emulsion, or the like is required, a supported emulsion containing granules of silver halide is preferred.

Bronstead bases that bind to at least one hydrogen ion may be used as pH indicators of the present invention. Commonly, the acid form of the indicator is one color while the basic form of the indicator is a different color. Also, one form may be colorless and the other may be colored. Indicators used with the present invention should provide a distinct and easily recognized endpoint for a pH of about 3–10. pHydrion vivid 1–11 one-drop indicator solution, for example, can be used. Other examples of indicators that can be used are found in the "CRC Handbook of Chemistry and Physics, 64$^{th}$ edition, CRC Press, R. C. Weast ed., Boca Raton Fla., 1984, pp. D151–155, incorporated by reference herein, and include cresol red, thymol blue, 2-(p-dimethylaminophenylazo)pyridine, metacresol purple, bromophenol blue, p-dimethylaminoazobenzene, congo red, methyl orange, ethyl orange, bromocresol green, resazurin, 4-phenylazo-1-napthylamine, lacmoid, ethyl red, alizarin red s, methyl red, propyl red, bromocresol purple, chlorophenol red, p-nitrophenol, alizarin, bromothymol blue, m-dinitrobenzoylene urea, brilliant yellow, phenol red, neutral red, m-nitrophenol, cresol red, curcumin, metacresol purple, thymol blue, o-cresolphthalein, p-naptholbenzene, phenolphthalein, aniline blue, chromotropic acid, fluorescein, magdala red, α-napthylamine, β-naphtylamine, phloxine, salicylic acid, acridine, dichlorofluorescein, 3,6-dioxyxanthone, erythrosine, β-methylesculetin, Neville-Winther acid, resorufin, quininic acid, quinine, acid R phosphine, brilliant diazol yellow, Cleves acid, coumaric acid, 3,6-dioxyphthalic dinitrile, magnesium 8-hydroxyquinolinate, β-methylumbelliferone, 1-napthol-4-sulfonic acid, orcinaurine, thioflavine, umbelliferone, acridine orange, ethoxyphenylnapthostilbazonium chloride, napthazol derivatives, α-napthionic acid, 2-napthol-3,6-disulfonic acid, β-napthol, α-naptholsulfonic acid, 1,4-naptholsulfonic acid, orcinsulfonphthalein, sodium 1-napthol-2-sulfonate, and the like, and combinations thereof. Indicators that provide a visible color change at a pH of about 6–8 are preferred.

A wide variety of reducing agents can be used with the present invention. These include reducing agents referred to as "developers" in "The Theory of Photographic Process," 3$^{rd}$ edition, edited by T. H. James, The Macmillan Company, 1966, which is hereby incorporated by reference. These reducing agents can be inorganic reducing agents such as metals and metal complexes, where the metal has a variable valence. They include iron, titanium, chromium, and vanadium, and complexes of these metals and in particular, iron(II) complexes, titanium(III) complexes, chromium(II) complexes, and vanadium(II) complexes. Iron(II) complexes can be present as neutral complexes such as various substituted bis(cyclopentadienyl)iron complexes, or as salts such as salts of organic acids that include oxalic acid, lactic acid, salicylic acid, citric acid, tartaric acid, formic acid, and the like. Preferred reducing agents of the present invention are complexes of Fe(II) and EDTA and, in particular, Fe(II)(H$_2$EDTA) (I, EDTA=ethylenediaminetetraacetate), which shows little change in activity over a wide range, pH 3–10 (see "Kinetics of Development by the Ferrous Ethylenediaminetetraacetate Complex Ion", T. H. James, Photographic Science and Engineering, vol. 4, no. 5, September-October 1960, p 271). Fe(II)(H$_2$EGTA) (II, EGTA is ethyleneglycol-bis(2-aminoethylether)-N,N,N',N'-tetraacetate) is also preferred reducing agent. In contrast to EDTA and its salts, EGTA and its salts do not attenuate the response of the solution to radiation by buffering the solution.

These reducing agents also include inorganic nonmetallic reducing agents such as hydrogen peroxide, hydroxylamine, hydrazine, and dithionite.

These reducing agents also include aromatic/aliphatic organic reducing agents such as phenols, hydroquinones, hydroxylamines, hydrazines, carboxylic acids, guanidines, semicarbazides, hydrazides, hydrazones, dihydroxynapthalenes, α-hydroxyketones, α-aminoketones, aromatic hydrazines, and carboxylic acids of aromatic hydrazines. Some specific examples of these types of compounds that can be used are phenyl hydrazine, α-napthylhydrazine, β-napthylhydrazine, diphenyl hydrazine, hydrazobenzene, 4,4'-dihydrazinobiphenyl, aminoguanidine, aminourea, thiosemicarbazide, metol, hydroquinone, catechol, pyrogallol, 1,4-dihydroxynaphtalene, 1,5-dihydroxynapthalene, 2,6-dihydroxynapthalene, p-aminophenol and derivatives thereof, and p-phenylenediamine and derivatives thereof such as 2,4-diaminophenol dihydrochloride (also known as amidol), dihydroxyacetone, ascorbic acid, hydroxytetronic acid, furoin, o-aminophenol, and o-phenylenediamine.

The pH of a dosimeter may need adjusting prior to use since the activity of the reducing agent can vary with pH. Hydroquinone for example, becomes inactive at a low pH.

The present invention also includes reducing agents that change color when oxidized. These types of reducing agents can also act as indicators. One such reducing agent is Ti(III)(HEGTA) (III), which was prepared by combining a degassed solution of H$_4$EGTA and lithium hydroxide with a degassed acidic titanium (III) chloride solution. Complex III changes from purple to colorless when oxidized, for example by aggregate product $(AgX)_{n-m}Ag^0_m$. Additional pH indicators may be added to enhance the color change, although this is not required. Clearly, many different combinations of reducing agents and pH indicators can be used to provide an embodiment of the present invention.

The present invention may include an optional buffer system to attenuate the radiation threshold. The initial acid (HX) produced combines with the base of the buffer system until the buffer system is exhausted, after which any additional acid combines with the indicator to produce a color change.

In contrast to film badges, which require laboratory development, the dosimeter of the present invention can measure the total dosage of radiation received without the need for a laboratory. The threshold dosage required for the color change depends on the size of the silver halide granules, the area of the emulsion, the concentration of the pH indicator, and other factors. Generally, the radiation threshold of a dosimeter can be lowered by increasing the size of the silver halide granules and by increasing the surface area covered by the silver halide. The threshold can also be increased by providing a concentration of indicator sufficiently high to produce a buffer system as acid is being generated.

The following example illustrates how a dosimeter of the present invention was made. An aqueous solution of Fe(II) (H$_2$EDTA) and phenol red indicator was prepared and sealed inside a tubular breakable container. A radiation-sensing element used in this example was Fuji™ x-ray film. The sealed container, the film cut to the appropriate size, and the opaque body plate were placed into the appropriate recesses and cavity in the opaque body member, which was then sealed to the transparent body member. The dosimeter is now ready for use. It can be stored, or worn as a badge for hours to months. When the user wished to know their radiation dosage, the breakable container is broken and the solution previously inside the container flows into the cavity and contacts the emulsion. A volume of developer/indicator solution sufficient to contact the emulsion and still be visible through the transparent portion of the device should be used.

While FIG. 1 and FIG. 2 show an embodiment of the dosimeter of the present invention with a substantially flat body shape, it should be understood that other shapes that accommodate the elements of the dosimeter can also be used.

A worker in the nuclear industry can use the dosimeter to determine a total dose of x-ray-, neutron-, and gamma-radiation. Often times, the types of radiation a worker is exposed to are known and it may not be necessary to distinguish between the types of radiation that contribute to the detected dose.

The dosimeter invention can be modified to enhance, attenuate, or eliminate the response to specific types of radiation. The dosimeter body, for example, can be modified to absorb a specific type or types of radiation and pass other types of radiation. To detect neutron radiation in the presence of gamma radiation, for example, the opaque portion of the dosimeter body can be coated with, or otherwise include, lead.

The dosimeter can also be sensitized to a particular type of radiation by including materials that emit a type of radiation that interacts more effectively with the silver halide when another type of radiation that interacts less effectively with the silver halide is absorbed. The response of the dosimeter to neutrons, for example, can be enhanced if the dosimeter body includes polyethylene, polypropylene, graphite, or similar materials that enhance the flux of thermal neutrons through the dosimeter. The dosimeter response to thermal neutrons can be enhanced by mixing chemical compounds having $^6$Li, $^{10}$B, $^{113}$Cd, or $^{155,157}$Gd with the silver halide emulsion. Silver halide can be mixed with lithium hydroxide ($^6$LiOH), lithium chloride ($^6$LiCl), cadmium chloride ($^{113}$CdCl$_2$), or other similar compounds. The following equations summarize how $^6$Li, $^{10}$B, $^{113}$Cd, and $^{155,157}$Gd interact with thermal neutrons to produce alpha and gamma radiation:

$^6$Li+neutron→alpha+$^3$H (equation 7)

$^{10}$B+neutron→alpha+$^7$Li (equation 8)

$^{113}$Cd+neutron→gamma+$^{114}$Cd (equation 9)

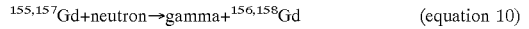

$^{155,157}$Gd+neutron→gamma+$^{156,158}$Gd (equation 10)

The alpha- and gamma-radiation produced interact more effectively with the silver halide than the thermal neutrons do.

The foregoing description of the invention has been presented for purposes of illustration and description and is not intended to be exhaustive or to limit the invention to the precise form disclosed, and obviously many modifications and variations are possible in light of the above teaching.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A dosimeter that detects ionizing radiation, comprising:
   (a) a breakable sealed container;
   (b) a solution comprising a reducing agent inside said sealed container;
   (c) a silver salt (AgX) selected from the group consisting of silver chloride, silver bromide, silver iodide, and mixtures thereof; and
   (d) an air-tight dosimeter body having a transparent portion and an opaque portion, said transparent portion including a transparent chamber for receiving said sealed breakable container, said opaque portion including an opaque chamber for receiving the silver salt and a winding passageway that separates and provides fluid communication between said transparent chamber and said opaque chamber.

2. The dosimeter of claim 1, wherein the silver salt comprises an emulsion having granules of silver salt.

3. The dosimeter of claim 1, wherein the reducing agent reduces the product obtained from the interaction of ionizing radiation with said granules of silver salt.

4. The dosimeter of claim 3, wherein said reducing agent provides a detectable color change.

5. The dosimeter of claim 4, wherein the reducing agent is selected from the group consisting of iron (II) complexes, titanium (III) complexes, chromium (II) complexes, vanadium (II) complexes.

6. A dosimeter that detects ionizing radiation, comprising:
   (a) a breakable sealed container;
   (b) a solution inside said sealed breakable container, said solution comprising a reducing agent and a chemical pH indicator for providing a detectable color change at a pH of about 3–10;
   (c) a silver salt (AgX) selected from the group consisting of silver chloride, silver bromide, silver iodide, and mixtures thereof; and
   (d) an air-tight dosimeter body having a transparent portion and an opaque portion, the transparent portion including a transparent chamber for receiving said sealed breakable container, the opaque portion including an opaque chamber for receiving the silver salt and a passageway that provides fluid communication between the transparent chamber and the opaque chamber.

7. The dosimeter of claim 6, wherein said chemical pH indicator is selected from the group consisting of cresol red, thymol blue, 2-(p-dimethylaminophenylazo)pyridine, meta-cresol purple, bromophenol blue, p-dimethylaminoazobenzene, congo red, methyl orange, ethyl orange, bromocresol green, resazurin, 4-phenylazo-1-napthylamine, lacmoid, ethyl red, alizarin red s, methyl red, propyl red, bromocresol purple, chlorophenol red, p-nitrophenol, alizarin, bromothymol blue, m-dinitrobenzoylene urea, brilliant yellow, phenol red, neutral red, m-nitrophenol, cresol red, curcumin, metacresol purple, thymol blue, o-cresolphthalein, p-naptholbenzene, phenolphthalein, aniline blue, chromotropic acid, fluorescein, magdala red, α-napthylamine, β-naphtylamine, phloxine, salicylic acid, acridine, dichlorofluorescein, 3,6-dioxyxanthone, erythrosine, β-methylesculetin, Neville-Winther acid, resorufin, quininic acid, quinine, acid R phosphine, brilliant diazol yellow, Cleves acid, coumaric acid, 3,6-dioxyphthalic dinitrile, magnesium 8-hydroxyquinolinate, β-methylumbelliferone, 1-napthol-4-sulfonic acid, orcinaurine, thioflavine, umbelliferone, acridine orange, ethoxyphenylnapthostilbazonium chloride, napthazol derivatives, α-napthionic acid, 2-napthol-3,6-disulfonic acid, β-napthol, α-naptholsulfonic acid, 1,4-naptholsulfonic acid, orcinsulfonphthalein, sodium 1-napthol-2-sulfonate, and combinations thereof.

8. The dosimeter of claim 6, wherein said reducing agent is selected from the group consisting of of iron (II) complexes, titanium (III) complexes, chromium (II) complexes, vanadium (II) complexes, phenols, hydroquinones, hydroxylamines, hydrazines, carboxylic acids, guanidines, semicarbazides, hydrazides, hydrazones, dihydroxynapthalenes, α-hydroxyketones, α-aminoketones, aromatic hydrazines, and carboxylic acids of aromatic hydrazines, and combinations thereof.

9. The dosimeter of claim 8, wherein said reducing agent is selected from the group consisting of Fe(II)(H$_2$EDTA), Ti(III)(HEDTA), Fe(II)(H$_2$EGTA), Ti(III)(HEGTA), hydrogen peroxide, hydroxylamine, hydrazine, dithionite, phenyl hydrazine, α-napthylhydrazine, β-napthylhydrazine, diphenyl hydrazine, hydrazobenzene, 4,4'-dihydrazinobiphenyl, aminoguanidine, aminourea, thiosemicarbazide, metol, hydroquinone, catechol, pyrogallol, 1,4-dihydroxynaphtalene, 1,5-dihydroxynapthalene, 2,6-dihydroxynapthalene, p-aminophenol, p-phenylenediamine, 2,4-diaminophenol dihydrochloride, dihydroxyacetone, ascorbic acid, hydroxytetronic acid, furoin, o-aminophenol, and o-phenylenediamine.

10. A method for detecting ionizing radiation, comprising the steps of:
 (a) providing a dosimeter that detects ionizing radiation, the dosimeter comprising a breakable sealed container, a solution comprising a reducing agent inside the sealed container, granules of a silver salt (AgX) selected from the group consisting of silver chloride, silver bromide, silver iodide, and mixtures thereof, and an air-tight dosimeter body having a transparent portion and an opaque portion, the transparent portion including a transparent chamber for receiving the sealed breakable container, the opaque portion including an opaque chamber for receiving the silver emulsion and a winding passageway that separates and provides fluid communication between the transparent chamber and the opaque chamber;
 (b) exposing the dosimeter to ionizing radiation;
 (c) breaking the breakable container and allowing the solution to flow from the transparent chamber, through the winding passageway, and into the opaque chamber containing the emulsion and physically contact the emulsion; and
 (d) detecting any color change in the solution.

11. The method of claim 10, wherein the silver salt comprises an emulsion having granules of silver salt.

12. The method of claim 10, wherein the reducing agent reduces the product obtained from the interaction of ionizing radiation with said granules of silver salt.

13. The method of claim 10, wherein said reducing agent provides a detectable color change.

14. The method of claim 13, wherein the reducing agent is selected from the group consisting of titanium (III) complexes, chromium (II) complexes, vanadium (II) complexes.

15. A method for detecting ionizing radiation, comprising the steps of:
 (a) providing a dosimeter that detects ionizing radiation, the dosimeter comprising a breakable sealed container, a solution inside the breakable sealed container comprising a reducing agent and a pH indicator for providing a detectable color change at a pH of about 3–10, granules of a silver salt (AgX) selected from the group consisting of silver chloride, silver bromide, silver iodide, and mixtures thereof, and an air-tight dosimeter body having a transparent portion and an opaque portion, the transparent portion including a transparent chamber for receiving said sealed breakable container, the opaque portion including an opaque chamber for receiving the silver emulsion and a passageway that provides fluid communication between the transparent chamber and the opaque chamber;
 (b) exposing the dosimeter to ionizing radiation;
 (c) breaking the breakable container and allowing the solution to flow from the transparent chamber, through the passageway, and to into the opaque chamber containing the emulsion and physically contact the emulsion; and
 (d) detecting any color change in the solution.

16. The method of claim 15, wherein said chemical pH indicator is selected from the group consisting of cresol red, thymol blue, 2-(p-dimethylaminophenylazo)pyridine, metacresol purple, bromophenol blue, p-dimethylaminoazobenzene, congo red, methyl orange, ethyl orange, bromocresol green, resazurin, 4-phenylazo-1-napthylamine, lacmoid, ethyl red, alizarin red s, methyl red, propyl red, bromocresol purple, chlorophenol red, p-nitrophenol, alizarin, bromothymol blue, m-dinitrobenzoylene urea, brilliant yellow, phenol red, neutral red, m-nitrophenol, cresol red, curcumin, metacresol purple, thymol blue, o-cresolphthalein, p-naptholbenzene, phenolphthalein, aniline blue, chromotropic acid, fluorescein, magdala red, α-napthylamine, β-naphtylamine, phloxine, salicylic acid, acridine, dichlorofluorescein, 3,6-dioxyxanthone, erythrosine, β-methylesculetin, Neville-Winther acid, resorufin, quininic acid, quinine, acid R phosphine, brilliant diazol yellow, Cleves acid, coumaric acid, 3,6-dioxyphthalic dinitrile, magnesium 8-hydroxyquinolinate, β-methylumbelliferone, 1-napthol-4-sulfonic acid, orcinaurine, thioflavine, umbelliferone, acridine orange, ethoxyphenylnapthostilbazonium chloride, napthazol derivatives, α-napthionic acid, 2-napthol-3,6-disulfonic acid, β-napthol, α-naptholsulfonic acid, 1,4-naptholsulfonic acid, orcinsulfonphthalein, sodium 1-napthol-2-sulfonate, and combinations thereof.

17. The method of claim 15, wherein said reducing agent is selected from the group consisting of of iron (II) complexes, titanium (III) complexes, chromium (II) complexes, vanadium (II) complexes, phenols, hydroquinones, hydroxylamines, hydrazines, carboxylic acids, guanidines, semicarbazides, hydrazides, hydrazones, dihydroxynapthalenes, α-hydroxyketones, α-aminoketones, aromatic hydrazines, and carboxylic acids of aromatic hydrazines, and combinations thereof.

18. The method of claim 17, wherein said reducing agent is selected from the group consisting of Fe(II)(H$_2$EDTA), Ti(III)(HEDTA), Fe(II)(H$_2$EGTA), Ti(III)(HEGTA), hydrogen peroxide, hydroxylamine, hydrazine, dithionite, phenyl hydrazine, α-napthylhydrazine, β-napthylhydrazine, diphenyl hydrazine, hydrazobenzene, 4,4'-dihydrazinobiphenyl, aminoguanidine, aminourea, thiosemicarbazide, metol, hydroquinone, catechol, pyrogallol, 1,4-dihydroxynaphtalene, 1,5-dihydroxynapthalene, 2,6-dihydroxynapthalene, p-aminophenol, p-phenylenediamine, 2,4-diaminophenol dihydrochloride, dihydroxyacetone, ascorbic acid, hydroxytetronic acid, furoin, o-aminophenol, and o-phenylenediamine.

\* \* \* \* \*